US005496585A

United States Patent [19]

Hamilton et al.

[11] Patent Number: 5,496,585
[45] Date of Patent: * Mar. 5, 1996

[54] METHOD FOR REDUCING VOLATILE ORGANIC COMPOUND EMISSIONS

[75] Inventors: C. Richard Hamilton, Arvada; Ross M. Gustafson, Golden; Ralph Z. Marsh, Lakewood, all of Colo.

[73] Assignee: Golden Technologies Company, Inc., Golden, Colo.

[*] Notice: The portion of the term of this patent subsequent to Sep. 28, 2010, has been disclaimed.

[21] Appl. No.: 896,413

[22] Filed: Jun. 10, 1992

Related U.S. Application Data

[63] Continuation-in-part of Ser. No. 849,424, Jul. 10, 1992, Pat. No. 5,248,343, which is a national state of international application number PCT/US91/09310, filed Dec. 6, 1991, said Ser. No. 849,424, which is a continuation-in-part of Ser. No. 624,140, Dec. 7, 1990, abandoned.

[51] Int. Cl.⁶ ........................................ B05D 7/22
[52] U.S. Cl. .................. 427/239; 427/299; 427/302; 427/327; 427/385.5; 427/388.1; 427/407.1; 427/444
[58] Field of Search ..................... 427/299, 239, 427/302, 327, 444, 409, 407.1, 388.1

[56] References Cited

U.S. PATENT DOCUMENTS

| | | | |
|---|---|---|---|
| Re. 29,649 | 5/1978 | Farnsworth | 252/171 |
| Re. 32,661 | 5/1988 | Binns | 252/142 |
| 3,023,144 | 2/1962 | Greathouse et al. | 167/58 |
| 3,634,338 | 1/1972 | Laugle et al. | 252/525 |
| 3,874,921 | 4/1975 | Todd | 427/327 |
| 3,964,936 | 6/1976 | Das | 148/6.27 |
| 3,969,135 | 7/1976 | King et al. | 134/41 |
| 4,009,115 | 2/1977 | Binns | 252/142 |
| 4,082,867 | 4/1978 | Henley et al. | 427/327 |
| 4,091,954 | 5/1978 | Wallace | 220/470 |
| 4,136,217 | 1/1979 | Henley | 427/327 |
| 4,270,957 | 6/1981 | Donakowski et al. | 134/2 |
| 4,336,152 | 6/1982 | Like et al. | 252/106 |
| 4,362,638 | 12/1982 | Caskey et al. | 252/90 |
| 4,379,168 | 4/1983 | Dotolo | 424/356 |
| 4,414,128 | 11/1983 | Goffinet | 252/111 |
| 4,445,813 | 5/1984 | Misra et al. | 413/1 |
| 4,477,290 | 10/1984 | Carroll et al. | 148/6 |
| 4,506,533 | 3/1985 | Hessel et al. | 72/42 |
| 4,511,488 | 4/1985 | Matta | 252/162 |
| 4,540,505 | 9/1985 | Frazier | 252/106 |
| 4,599,116 | 7/1986 | King et al. | 134/2 |
| 4,620,937 | 11/1986 | Dellutri | 252/143 |
| 4,640,719 | 2/1987 | Hayes et al. | 134/40 |
| 4,704,225 | 11/1987 | Stoufer | 252/153 |
| 4,749,516 | 6/1988 | Brusky | 252/546 |
| 4,767,563 | 8/1988 | de Buzzaccarini | 252/174 |
| 4,790,951 | 12/1988 | Frieser et al. | 252/162 |
| 4,797,231 | 1/1989 | Schumann et al. | 252/547 |

FOREIGN PATENT DOCUMENTS

| | | |
|---|---|---|
| 2636149 | 3/1977 | Germany . |
| 2713516 | 9/1978 | Germany . |
| 2026551 | 5/1978 | United Kingdom . |
| 1603047 | 11/1981 | United Kingdom . |
| 2143254 | 2/1985 | United Kingdom . |

*Primary Examiner*—Janyce Bell
*Attorney, Agent, or Firm*—Sheridan Ross & McIntosh

[57] ABSTRACT

Disclosed is a process for reducing volatile organic compound emissions during the processing and coating of articles contaminated with water insoluble contaminants. The process prevents the formation of undesired etching and pitting which increases the surface area of an article. The use of volatile organic compound-containing surface coatings is thereby reduced resulting in reduced volatile organic compound emissions. The process of the present invention includes contacting a surface with a terpene finishing agent to remove water insoluble contaminants from such surface and applying an amount of volatile organic compound-containing coating to effectively cover the surface at a desired coating thickness.

28 Claims, 7 Drawing Sheets

METHOD FOR REDUCING VOLATILE ORGANIC COMPOUND EMISSIONS

REFERENCE TO RELATED APPLICATIONS

This application is a continuation-in-part of U.S. application Ser. No. 07/849,424, filed Jul. 10, 1992, now U.S. Pat. No. 5,248,343 which is a national phase of Patent Cooperation Treaty Application Ser. No. US91/09310 filed Dec. 6, 1991 having priority based upon U.S. application Ser. No. 07/624,140 filed Dec. 7, 1990, now abandoned. U.S. application Ser. No. 07/849,424 is a continuation-in-part of U.S. application Ser. No. 07/624,140.

FIELD OF THE INVENTION

This invention relates to a process for reducing the amount of volatile organic compound (VOC) emissions released into the atmosphere during the finishing and coating of surfaces, and particularly the finishing and coating of metal containers.

BACKGROUND OF THE INVENTION

Air quality is a major environmental concern. Despite the Clean Air Act of 1977, a widespread and persistent air pollution problem is the emission of compounds that generate lower atmospheric pollution harmful to the human body and compounds that destroy ozone in the Earth's upper atmosphere. It is calculated that over 100 million Americans currently live in cities which have air pollution levels beyond public health standards. Upper atmosphere ozone is able to absorb harmful ultraviolet radiation that would otherwise penetrate the Earth's atmosphere and result in higher incidences of human skin cancer. The cause of this pollution is largely due to the number and diversity of air pollutant sources, including utilities, industries and transportation.

Volatile organic compound (VOC) emissions contribute significantly to air pollution problems in general and in particular, to the destruction of ozone. For instance, VOCs such as chlorofluorocarbons are known to destroy ozone in the Earth's upper atmosphere. Other VOCs are chemicals that can react with sulfur, carbon and hydrogen compounds which can, in the presence of heat and sunlight, form smog or smog-producing compounds. The Clean Air Act of 1990 sets new standards for air quality control resulting in stricter pollution standards for VOC emissions. Thus, industries are faced with the problem of maintaining desired levels of commercial production while at the same time keeping VOC emissions within the new federal regulations.

In various industries it is necessary to remove oils from the surfaces of metals prior to the use of those metals in various ways, for example, in the manufacture of sheet metal for cars, airplanes, appliances, metal components used in high technology industries, food and beverage containers, etc. It is in the treating and coating of such surfaces that significant VOC pollutant problems arise. Oftentimes, production levels in particular industries are limited by the amount of VOCs that can be emitted in a given period of time. This is precisely the case in the metal container industry. Specifically, in the manufacture of metal containers, metal is stamped, formed, drawn and ironed into a desired container configuration, and are finally coated with inks and exterior and interior coatings. During the forming process, residual quantities of oils are deposited on the surface of the metal which must be removed prior to subsequent use of the metal. For instance, such oils must be removed prior to the application of decorative or protective coatings to the metal.

In conventional processes designed to remove undesired oils from the surface of metal, relatively strong acid or caustic solutions are typically used. Primarily, strong acid solutions consisting of hydrofluoric, sulfuric, phosphoric, nitric, and similar acids are used. For example, U.S. Pat. No. Re 32,661 to Binns discloses a method of finishing aluminum using an acidic aqueous solution having a pH less than 2. Similarly, U.S. Pat. No. 3,969,135 by King discloses a composition and process for finishing aluminum using a low temperature aqueous acidic solution with a pH of less than 2.

While the use of acid and caustic solutions to finish metal is effective to remove oil, the use of such solutions presents substantial problems in that they negatively effect the integrity of the metal. For example, the acidic and caustic finishing agents currently in use in container manufacturing operations etch and pit the metal surfaces being finished. During the drawing and ironing procedures for the manufacture of aluminum beverage containers, manganese-iron particles present in the aluminum may create pits and gouges in the metal. Acidic and caustic finishing agents deepen such pits and gouges, causing the surface of the metal to be etched and pitted. The etching and pitting of metal surfaces resulting from the use of acid or caustic finishing agents increases the total surface area of the metal.

The manufacture of metal containers is typically completed by coating the inside and the outside of the containers with inks and protective coatings. The total amount of coating required to achieve sufficient coverage of a metal surface is directly related to the surface area of the metal to be coated. Pits and etches caused by acidic or caustic finishing agents increase the total surface area to be coated, therefore requiring additional amounts of coating to achieve desired coverage.

The compositions of interior and exterior coatings currently used to coat the interior and exterior surfaces of metal containers include VOC-containing coatings that present significant environmental problems in the container manufacturing industry. Both interior and exterior coatings can contain solvents that are released into the atmosphere as VOCs upon curing of such coatings. Thus, the amount of interior or exterior coating required to sufficiently coat a metal surface is directly proportional to the amount of VOCs released into the atmosphere. In view of the environmental concerns highlighted above, a need exists for a new method for finishing metal surfaces able to decrease the surface area of the finished metal, thereby allowing for a reduction in the amount of necessary coatings applied to such surfaces, leading to a consequent reduction in VOC emissions.

SUMMARY OF THE INVENTION

The present invention is directed to a new method for reducing the amount of environmentally hazardous volatile organic compound (VOC) emissions released into the atmosphere during the finishing and coating of metal surfaces. The present method is unique because it uses a VOC-containing agent in a finishing process to accomplish a reduction in the total VOC emissions produced in the finishing process.

The present method includes contacting a surface with a finishing agent to remove undesired oils or particulate matter from a surface prior to coating such surface. The finishing agent used in the process effectively removes undesired oils and particulate matter without etching the surface, significantly reducing the area of the surface when compared with the area of surfaces finished with acidic or caustic finishing agents. By reducing the area of the surface to be coated, the amount of interior and exterior coatings required to sufficiently cover such surfaces is reduced. Because surface coatings are responsible for the majority of the VOCs released during typical finishing and coating process, a reduction in the amount of coatings required to coat a surface has the affect of reducing the overall VOC emissions produced in the process.

The present invention is particularly useful in the manufacturing of metal containers. A finishing agent having a substantially neutral pH is used to remove primarily oil-based contaminants applied during the manufacture of metal containers. The pH of the finishing agent used can range from about pH 6.0 to about pH 9.0 and preferably includes, as an active agent, a terpene such as d-limonene, $\alpha$-terpineol, $\beta$-terpineol, $\alpha$-pinene, $\beta$-pinene, alcohols of these compounds, or mixtures thereof. Preferably, a metal surface is contacted with a composition containing between about 2 volume percent and about 40 volume percent of a terpene and between about 0.1 volume percent and about 3 volume percent of a surfactant and rinsed with water to obtain a container having a roughness average (Ra) of less than about 5.0 Ra as measured on the outside diameter of the metal container and a Ra value of less than about 10.0 as measured on the inside diameter of the metal container. Due to this surface roughness, a method is provided for decreasing the amount of VOC-containing interior and exterior coating required to sufficiently coat a surface, particularly surfaces of metal containers.

DETAILED DESCRIPTION OF THE INVENTION

Figure 1:
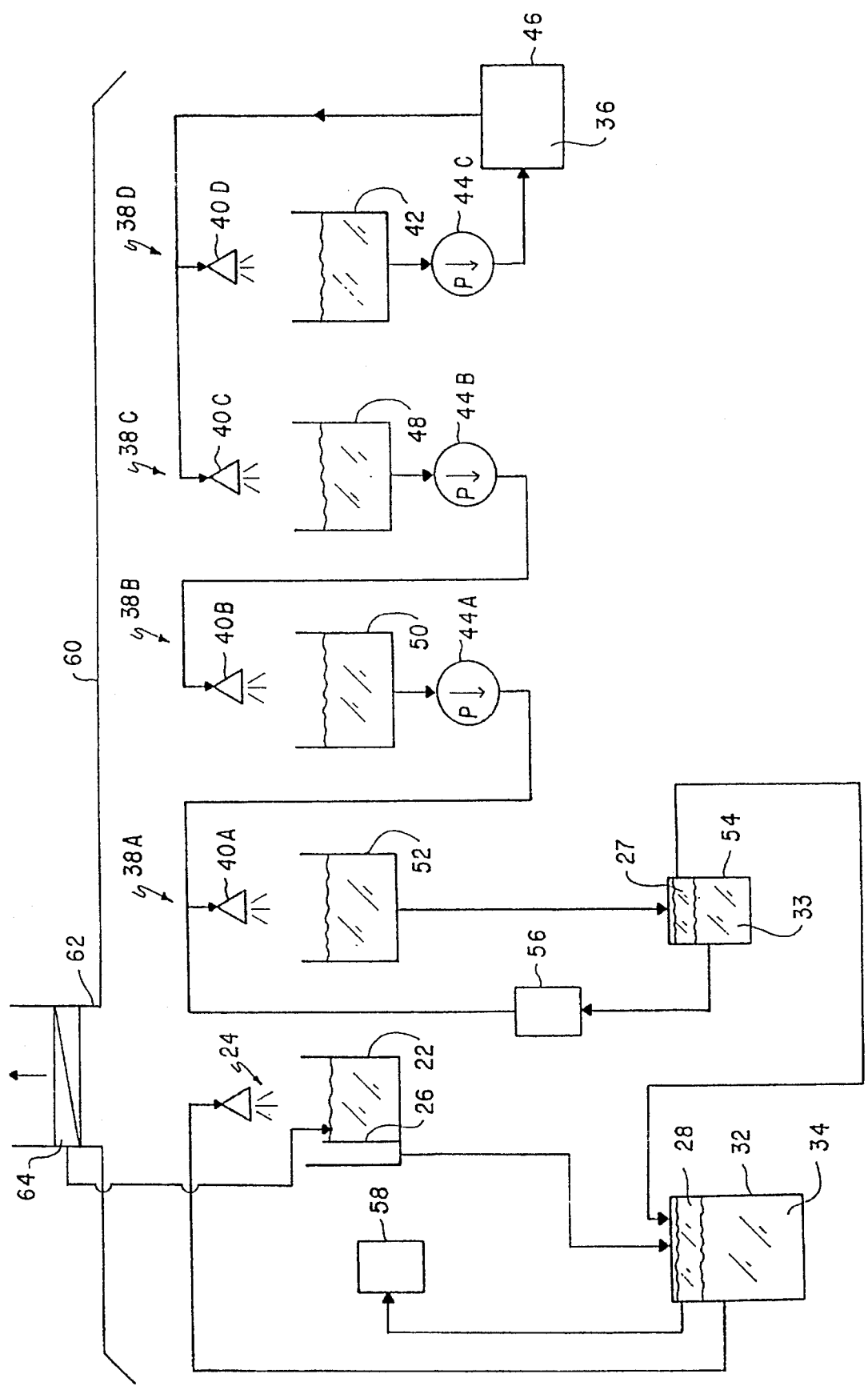
FIG. 1 is a schematic flow diagram showing the spray application of a finishing agent and rinse water and the flow of fluids throughout the washing, rinsing and reclaim stages of the present invention.

The present invention relates to a process for reducing VOC emissions by finishing surfaces with a finishing agent that does not substantially increase the area of such surfaces, thus reducing the amount of VOC-containing coatings required to cover such surfaces. The surfaces that can be treated in accordance with the present invention include, but are not limited to, ceramic, fiberglass, plastic, wood, and in particular, metals that are susceptible to etching or pitting by acidic or caustic finishing agents. Such metals include, but are not limited to, aluminum, including treated aluminum, magnesium, including treated magnesium, tin-free steel, brass, tin, copper or alloys thereof. The present invention has application in the finishing of metals used to produce parts for automobiles, airplanes, appliances, railroad cars, metal components used in high technology industries, computer and calculator face plates, containers, precision metal parts, shiny metal components (e.g., doorknobs), and other manufactured metal articles. By providing a method for substantially preventing the etching and pitting of metal surfaces, the amount of VOC-containing protective and decorative coatings required to adequately cover a surface is reduced, with a consequent reduction in undesired VOC emissions. The method of the present invention is particularly useful in reducing the amount of VOCs emitted in the production of metal containers.

The present invention is useful in processes for removing oil contaminants and metal fines from metal containers and/or from metal used in making metal containers without the consequential etching and pitting typically seen when conventional acidic or caustic finishing agents are used. In the absence of etching and pitting, the surface area of the metal surface is not substantially increased as is the case when a surface is etched or pitted. As a result of the decreased surface area of the metal, the amounts of basecoat, ink, over-coat, interior coat or other protective or decorative coatings required to sufficiently coat the surface of the metal is reduced, thereby reducing the amount of VOC emissions produced during coating operations.

Traditionally, interior and exterior coating solutions contain VOC-containing solvents that, during heat curing of such coatings, are driven off to leave desired coatings on the surface of the metal. The solvents can include, but are not limited to, toluene, methylene chloride, isopropyl alcohol and butyl alcohol. The reduction of VOC-containing interior and exterior coatings used to coat a substantially non-etched and non-pitted surface directly translates into lower VOC emissions. Therefore, attendant with the reduction in the amount of coating required to achieve a desired coating thickness on a metal's surface is a reduction in the amount of VOCs emitted into the Earth's atmosphere.

While the present invention has particular application in the container manufacturing industry, it should be apparent that it also has application in various other fields in which problems with VOC emissions are present due to the coating of surfaces with VOC-containing compounds. It will be understood therefore, that while the following discussion is specifically directed to container manufacturing industries, it has equal application in other relevant industries.

In accordance with the present invention, oils, and specifically lubricants and/or coolants, deposited on the surface of metal during manufacturing processes are effectively removed by contacting the metal surface with a finishing agent in an amount and concentration sufficient to remove said oils from the surface of the metal.

As used herein, the term "finished" refers to the removal of undesired contaminants, specifically oils, from a given surface. An effective amount of a finishing agent is that amount that sufficiently cleans or otherwise removes oils from a given surface. Preferred finishing agents do not substantially etch the surface being finished. "Substantial etching", as used herein, is a relative term that generally refers to the amount of etching that occurs when a surface is treated with an acidic or caustic finishing agent.

The finishing agent can be contacted with the surface of the metal by spraying the finishing agent onto the metal surface, by immersing the surface of the metal in the finishing agent, or by any other suitable means. The resultant mixture of finishing agents, oils, as well as any water present in the finishing agent spray, are collected in a reservoir. Subsequently, the metal surface is rinsed with one or more stages of water and the rinse water is collected. The different components from the collected solutions can be separated from each other and reused in the metal finishing process or otherwise disposed of.

As used herein the term "oils" or "oil-based contaminants" refers to any water insoluble organic substance, particularly a petroleum-based or synthetic organic compound, that is deposited on an article's surface during industrial processes. As used herein, water insoluble substances refers to any substance that is not substantially dispersible in water at the molecular or ionic level. Such water insoluble substances are therefore not effectively removed from a surface by treatment with water alone. Contaminants typically will be lubricants and/or coolants, such as forming oils, cutting oils, mill oils, and anti-rust oils, which are commonly composed of petroleum oils, esters, diesters and/or fatty acids. Metal coil stock for making metal articles, such as containers is frequently contacted with a number of compositions to lubricate the surface of the metal and to reduce the temperature of the metal during forming operations. Oils that can be removed using the present invention include synthetic oils having a well-defined molecular weight range or petroleum-based oils having a well-defined molecular weight fraction, for example oils with a molecular weight of at least about 300 and more preferably above about 500 and with a minimum chain lengths of 20 to 50 carbon atoms. A preferred contaminant includes about 86 volume percent of a tetraester formed from esterification of 10–30 carbon chain saturated fatty acids with pentaerythritol, 12 volume percent of surfactants and emulsifiers, and 2 volume percent of a rust inhibitor.

The method of the present invention uses a finishing agent having a substantially neutral pH that effectively removes oils and other compounds deposited on metal surfaces during the manufacturing process. Substantially neutral pH solutions refers to solutions that do not cause readily detectable etching of a container's surface. More particularly, substantially neutral pH refers to solutions having a pH of between about pH 6.0 and about pH 9.0, more preferably between about pH 6.0 and about pH 8.0, and most preferably between about pH 6.5 and about pH 7.5. In one embodiment of the present invention, the active agent of the finishing agent is hydrophobic and preferably comprises an effective amount of a terpene for a particular finishing application. Terpenes have the general chemical formula $C_{10}H_{16}$ and are based on the isoprene unit $C_5H_8$. The term terpene includes terpene derivatives or terpenoids as well as monocyclic, bicyclic, polycyclic and acyclic terpenes. Preferred terpene compositions of the present invention include d-limonene, α-terpineol, β-terpineol, α-pinene, β-pinene, and alcohols of such compositions, or mixtures thereof.

The concentration of a terpene used in a finishing agent depends upon the amount and type of oils being removed, the method of application of the finishing agent, and various other factors. In one embodiment, the terpene is in water at concentrations from about 1.86 volume percent to about 37.2 volume percent, more preferably from about 4.65 volume percent to about 27.9 volume percent, and most preferably from about 9.3 volume percent to about 23.25 volume percent.

In one embodiment of the present invention, surfactants are used in conjunction with the finishing agent to facilitate rapid wetting of the surface of the metal containers and for emulsification of organic components. Surfactants may be added to the terpene-containing composition to enhance the solubility of the terpene finishing agent in the aqueous medium, or they can be separately contacted to the metal surface. Any suitable surfactant or mixtures of surfactants can be used and can be of the non-ionic, anionic, cationic or amphoteric type, and of natural or synthetic origin. Suitable surfactants for use in the present invention include, but are not limited to, nonylphenol, alkanolamide, (nonylphenoxy) polyethylene oxide, sodium salts of petroleum sulfonic acid, sorbitan sesquioleate and mixtures thereof. Specific suitable surfactants include Tergitol NP-7 sold by Union Carbide Corporation and WRS-1-66 sold by Cyclo-Corporation of Miami, Fla.. Tergitol NP-7 is a nonionic nonylphenol with an ethoxylated seven carbon chain. WRS-1-66 is a nonionic alkanolamide consisting of oleic acid DEA and DEA oleate.

The concentration of surfactant is maintained so as to achieve a stable aqueous solution of the finishing agent in water. As used herein, "aqueous solution" refers to a mixture of water, finishing agent (preferably terpene-based) and surfactant. Thus, the amount of surfactants used in a particular application should be sufficient to achieve desired finishing of articles and desired separation of contaminants from the aqueous solution. Typically, the concentration of surfactant used is between about 0.14 volume percent and about 2.8 volume percent, more preferably between about 0.35 volume percent and about 2.1 volume percent, and more preferably between about 0.7 volume percent and about 1.75 volume percent, based on total volume of the aqueous solution. In a preferred embodiment, the aqueous solution includes Tergitol NP-7 or a similar composition in a concentration of between about 0.12 volume percent and about 2.4 volume percent based on total volume of the aqueous solution, and WRS-1-66 or a similar composition in a concentration of between about 0.02 volume percent and about 0.4 volume percent, based on total volume of the aqueous solution. Typically the ratio of surfactant to finishing agent is less than about 9.5:90.5, more preferably between about 5:95 and about 8:92, and most preferably about 7:93.

In addition to finishing agent and surfactant, water is present in the aqueous solution in amounts between about 60 volume percent and about 98 volume percent, more preferably between about 70 volume percent and about 95 volume percent, and more preferably between about 75 volume percent and about 90 volume percent.

In accordance with the present invention metal containers are sprayed with finishing agent as they are conveyed past spray heads. For example, containers can be conveyed on a large mesh conveyor in an open-end down manner, with finishing agent sprays directed from the top and bottom so that the sprays contact all surfaces of the containers. Subsequently, the containers are rinsed with water and dried, typically with an oven dryer.

Metal surfaces finished in accordance with the method of the present invention have noticeable reductions in etching and pitting when compared with acid or caustic treated metal surfaces. The roughness average of the outside surface of a metal container finished in accordance with the present invention is less than about 5.0 Ra, preferably less than about 4.0 Ra, and most preferably less than about 3.0 Ra, wherein Ra is defined as the arithmetic mean of the departures of the profile produced by a profilometer from the mean line. The roughness average of the inside surface of a metal container finished in accordance with the present invention is less than about 10.0, preferably less than about 8.0 Ra, and most preferably less than about 6.0 Ra.

After a metal surface is finished according to the present invention, it is coated with decorative and/or protective coatings. In the instance of beverage and food containers, the outside of the metal container is often coated with an exterior coating, often a protective coating, to protect against puncturing or abrasion of the metal container during packaging and shipping. Decorative coatings are typically applied to metal containers before or simultaneously with such protective coatings. The inside of the container can be lined with an interior coating to prevent the beverage or food from coming into contact with the metal container.

It has been unexpectedly found that metal surfaces finished by the process of the present invention require less exterior and interior coating than those finished with acid or caustic agents. Without intending to be bound by theory, it is believed that the reduced amount of coating is achieved because, in the absence of etching and pitting of the metal surface, there is a reduction in the total metal surface area to be coated. As such, a reduced quantity of coating is required to coat the metal surface to a desired thickness. The reduction in the quantity of VOC-containing coatings required to sufficiently cover a metal container proportionally decreases the amount of VOCs released into the atmosphere.

In the coating of metal surfaces, coatings are applied to desired thicknesses to achieve various goals. For example, decorative coatings can be applied at thicknesses to achieve a desired color. Protective coatings on the outside of a container may be applied to a desired thickness to protect underlying decorations from scratching. Interior coating for food and beverage containers may be applied to a desired thickness to act as a barrier between the metal container and the food or beverage. The present invention, by reducing the increases in surface area from etching of a surface during finishing, reduces the amount of coating necessary to coat a metal surface to a desired thickness.

A sufficient coating thickness for the interior of containers must also be applied consistently over a given surface area. The consistency of coating coverage is typically determined by an acceptable enamel rating reader (ERR) value. ERR values are used to determine the integrity of coatings by assessing the ability of a coated container to conduct an electrical current. Adequately coated containers conduct little if any current. An acceptable ERR value of less than 10 milliamps (ma), and more preferably less than 5 ma, indicates the absence of a significant discontinuity in a coating on the interior surface of the container. In one embodiment of the present invention, the interior surfaces of the metal containers finished according to the method of the present invention are sufficiently coated as determined by ERR. Referring to Table 4, a 37% decrease in the amount of exterior coating used and an 18% decrease in the amount of interior coating used was attained on sufficiently coated containers treated according to the present invention.

Referring to Table 1, it has been unexpectedly found that despite the use of a VOC-containing composition (i.e., the terpene finishing agent), VOC emissions typically encountered in the coating of containers can be reduced by about 9.8 tons per billion containers due to the above mentioned decrease in coating usage. The VOC emissions contributed by the terpene used in the present process can be controlled by using a stack condenser capable of trapping terpene vapors, thus preventing VOC's from being released into the atmosphere. Preferably, terpenes collected by the stack condenser are reused to treat additional containers.

In one embodiment of the present invention as depicted in FIG. 1, the method is directed to the finishing of metal containers using a terpene finishing agent. Metal containers having oils on their surfaces are conveyed above a washer reservoir 22 and are sprayed with a terpene finishing agent 24, such finishing agent being effective in removing substantially all oils on such metal containers. The oils and terpene finishing agent 24 coming off of the containers during spraying are collected in a washer reservoir 22. The resultant wash solution mixture, containing water, terpene finishing agent, surfactants and oils is directed to a settling tank 32. In the settling tank 32, an insoluble phase 28 containing primarily the contaminant oils is allowed to separate from an aqueous phase 34 containing water, surfactants and finishing agent. The insoluble phase 28 floats above the aqueous phase allowing for separation of the two phases.

After being conveyed through the washer reservoir 22, the metal containers are then further conveyed through successive rinse stages 38 A, B, C and D where they are repeatedly sprayed with water to remove remaining traces of terpene finishing agent and oils present on the metal containers. A preferred embodiment of the rinsing process includes four rinsing stages 38 A, B, C and D. Metal containers are rinsed successively by each of the four stages. Rinse water is cycled through the first three 38 A, B and C of the four stages for reuse in prior rinse stages. Clean deionized water 36 is used as rinse water in the fourth and final rinse stage 38D, to remove all remaining traces of the above-identified components as well as minerals found in plant process water.

For ease of explanation, the following description of the rinsing process begins with the final stage 38D of the rinsing process and subsequently discusses the other three prior rinse stages 38 A, B, C and D in order to correspond to the direction of the flow of water in the process, which is opposite to the direction in which containers are conveyed. In the fourth rinse stage 38D, metal containers are sprayed with deionized water 36 directed through spray head 40D to remove any residual oils, or terpene finishing agent. The rinse water from the fourth rinse stage 38D is collected in a fourth stage reservoir 42. The rinse water from the fourth stage 38D is reused by directing it from the fourth stage reservoir 42, through a pump 44C and then through a deionizer 46 for further use in the fourth stage rinse 38D. Deionized water 36 is thus regenerated without the necessity of continuously adding new deionized water from outside of the system. Water loss caused by evaporation or by the adherence of water to the metal containers exiting the fourth rinsing stage 38D is compensated for by the addition of relatively small amounts of additional deionized water 36.

In one embodiment, the rinse water used in the third rinse stage 38C is also deionized water 36. In this embodiment, deionized water 36 is directed from the deionizer 46 used in the fourth stage 38D to the third spray head 40C. Alternatively, tap water can be used as rinse water in the third stage (not shown). The rinse water from the third stage is drained into the third stage reservoir 48, and subsequently conveyed by a pump 44B to the spray head 40B for the second stage rinse 38B.

After water is sprayed from the spray head 40B in the second stage rinse 38B, it drains into the second stage reservoir 50. Water is taken from the second stage reservoir 50 and subsequently conveyed to a pump 44A to the spray head 40A for the first stage rinse 38A. After water is sprayed from the spray head 40A in the first stage rinse 38A, it drains into the first stage reservoir 52.

Water from the first stage rinse 38A is collected in the first stage reservoir 52 and is recycled for use as rinse water for the first rinse stage 38A. Thus, the first rinse stage 38A is supplied with rinse water from both the first 52 and second 50 stage reservoirs. Recycling of the first stage rinse water is accomplished by use of a separator reservoir 54. Rinse water from the first stage reservoir 52 is directed to the separator reservoir 54 to allow finishing agent and oils 28 to separate from the aqueous water phase 33 of the resulting rinse solution. The oils 28 can then be directed to the settling tank 32. The aqueous phase 33 is conducted through a filter 56 to remove any remaining oils and is then returned for further use in first stage rinsing 38A of additional metal containers. Thus, in one embodiment of the invention, the water used in the washer reservoir 22 and the water used in the rinsing process, is continuously recycled for use in the washing and rinsing of metal containers. The only additional water supplied to the system is deionized water 36 furnished from outside the system.

The combined flow rate of rinse water in the four rinse stages 38 A, B, C and D is preferably sufficient to completely rinse finishing agent and oils from the metal containers. The amount of water used in each stage is preferably kept to a minimum in order to conserve water while at the same time thoroughly rinsing the metal containers.

After the third rinsing stage 38C, all terpene finishing agent and oils are rinsed from the metal containers and only deionized or tap water is on the metal containers. The fourth rinsing stage 38D rinses all water from the metal containers with deionized water 36. An acceptable flow rate and rinsing time in the fourth rinsing stage 38D to completely rinse water from the metal containers can be determined by experience. It should be appreciated that while use of various volumes of rinsing water may be used, the minimum amount of water necessary to obtain complete rinsing should be used to minimize process time and water use.

Between rinsing stages 38 A, B, C, and D or after the final rinse 38D, blowers (not shown) can be used to blow residual water from the containers. Containers can then be subsequently dried in ovens or other conventional drying or heating devices.

After metal containers are finished, as broadly described above, they can then be coated with an interior and/or exterior coating composition. For example, in a preferred embodiment, finished metal containers can be conveyed to a coating area where they are placed onto mandrels to facilitate the application of exterior coating. In one embodiment an appropriate design of viscous ink solution is rolled onto a rubber blanket that transfers the ink to the exterior surface of the metal container. A less viscous exterior coat is then rolled over the wet ink. After application of decorative coating and protective overcoat, the coatings are cured.

The exterior coat can be, for example, an acrylic, epoxy or other coating compositions having a given VOC content. When the exterior coating is heat cured, the VOC content of the coating is driven off. In one embodiment of the present invention, the amount of VOCs emitted during the application of the exterior coat is reduced by reducing the amount of exterior coat required to coat the exterior surface to a desired exterior coating thickness or build-up. For example, using the present invention, the amount of exterior coating required to sufficiently coat a 16 ounce container having a diameter of about 62 mm is below about 190 mg of exterior coating/container, more preferably below about 140 mg of exterior coating/container, and most preferably about 120 mg of exterior coating/container. This represents a 37% decrease in the amount of exterior coat required to coat containers treated in accordance with the method of the present invention compared with containers treated with acid or caustic finishing agents (see Table 3).

An alternative method of applying exterior coating to a container is to use an ultraviolet (UV) light curable acrylic composition. Such a composition allows the coated containers to be cured using UV light instead of heat. The UV light activates photoinitiators in the composition which catalyze the cross-linking of the acrylic monomers into polymers. Such compositions can be formulated with little or no VOCs. In a preferred embodiment of the present invention, the exterior coating comprises a UV curable acrylic coating composition having little or no VOC content. As a result, essentially no VOCs are emitted during the application of ink and exterior coatings to containers.

It is often necessary to coat the interior surface of a container to protect the contents of the container from the container's metal surface. Interior coatings typically include epoxy-based coatings having significant VOC contents. In one embodiment of the present invention, the amount of VOCs emitted during the application of the interior coating is reduced by reducing the amount of interior coat required to sufficiently coat the interior surface of metal containers to a desired thickness. Interior coatings for beer containers can generally be thinner than the interior coatings for containers holding carbonated soft drink beverages. Containers finished in accordance with the present invention typically require below about 165 mg of interior coat/container, preferably below about 145 mg of interior coat/container, and most preferably about 135 mg of interior coat/container. This represents a 18% decrease in the amount of interior coating required to effectively coat containers treated in accordance with the method of the present invention as compared to containers treated with acid or caustic finishing agents (see Table 3).

In one embodiment of the present invention, therefore, the amount of VOC emissions is reduced due to the decrease in the amount of interior and exterior coatings needed to sufficiently coat metal containers treated according to the present invention. In a preferred embodiment, the amount of VOC emissions is further reduced by using a UV curable exterior coating containing no VOC-containing solvents.

Interior coatings, for metal food and beverage containers, however, can not be UV cured due to Food and Drug Administration regulations. The photoinitiators used in UV coatings are not at present generally regarded as safe (GRAS) for use with food products. The interior coatings presently used contain VOC-containing solvents to allow for efficient application and curing of the coatings. In the most preferred embodiment of the present invention, VOC emissions are reduced by decreasing the amount of interior coating used to effectively coat the inner surface of a metal container.

One aspect of the present invention involves the control of VOC emissions by capturing VOCs from a processing line in which articles are contacted with a terpene finishing agent. In an uncontrolled situation, all of the volatilized terpene VOCs present in the exhaust stack would escape into the atmosphere via the exhaust stack. Such VOCs, however, can be captured using a stack condenser, carbon filters or other means known in the art. Referring to FIG. 1, in a preferred embodiment, vapors from the terpene finishing and rinsing stages are captured by a hood 60. The vapors are condensed by a stack condenser 64 placed within the exhaust stack 62 at about 60° F. and at a flow rate of about 250 ft$^3$/minute.

Despite the addition of terpene VOCs to the finishing operation, it has been unexpectedly found that under controlled conditions, the net VOC emissions encountered are significantly reduced by the present method. For instance, it is estimated that approximately 100 billion beverage containers are produced each year in the United States. Using the present method, VOC emissions presently encountered could be decreased by almost 20%. Referring to Example I, a stack exhaust from a container finishing and coating line was measured to determine the VOCs released. A stack condenser of the design in FIG. 1 can be used that traps about 99% of the terpene VOCs present in the stack exhaust. At a flow rate of 250 ft$^3$/minute, one percent (1%) of the VOCs would escape the stack as non-condensable VOCs due to the saturation limitations of the condenser. The calculations represented in Example I indicate that 1% VOC emissions amounts to about 7.25 tons of VOCs emitted during the production and coating of approximately 4.1 billion containers. However, because use of the present method results in an approximately 20% reduction in the amount of VOC-containing interior coating required to sufficiently coat the inner surface of such containers, there is approximately a 40 ton reduction of VOC emissions per 4.1 billion containers, produced and inner coated. Such a 40 ton reduction would result in a net reduction of approximately 32.75 tons of VOCs emitted per 4.1 billion containers inner coated.

In addition to stack emissions, negligible amounts of fugitive emissions may occur due to the use of terpene finishing agents. Fugitive emissions comprise VOCs that are not transported up the exhaust stack and that escape via open areas in a processing facility. Referring to the calculations presented in Example II, the amount of calculated fugitive VOCs that would be released during the production and coating of 4.1 billion containers is less than about 43 pounds.

Thus, the total amount of VOCs can be reduced using the present method because the amount of interior and exterior coating required to sufficiently coat the inner and outer surfaces of containers is reduced.

The following examples and test results are provided for the purposes of illustration and are not intended to limit the scope of the invention.

EXAMPLE I

A stack analysis was performed during a five hour test run to determine the amount of condensable and non-condensable VOCs generated from the use of a terpene finishing agent in the process of the present invention. The tests illustrate that the net effect of the process is a net reduction of VOC emissions. The VOC portion of the stack exhaust was analyzed by two independent laboratories using two different methods.

The stack exhaust analysis represents the exhaust released from one line of a container production facility in which a terpene finishing agent was used. Referring to FIG. 1, the exhaust stack 62 shows the location of a stack provided with a condenser 64 which would be cooled using water at a temperature of about 60° F. at a flow rate of about 28 gallons of water per minute to capture a condensable portion of emitted VOCs.

Urie Environmental Health Services (Wheatridge, Colo.) analyzed the VOC portion of the stack exhaust prior to installation of the condenser using a gas bomb method. The gases and organic compounds flowing through the stack at a rate of 250 cubic feet per minute were collected in a canister. The contents of the canister were tested. During a steady-state portion of a five hour run, the VOC portion of the stack exhaust was found to be 18.0 milligrams (mg) of VOC per liter of gas.

A second analysis was performed by COORS Environmental Laboratory of the Adolph Coors Company, (Golden, Colo.) using an absorption and extraction method. The VOC portion of the stack exhaust was passed over a carbon filter at a flow rate of 250 cubic feet per minute. During a steady-state portion of a five hour run, the VOC portion of the stack exhaust was found to be 19.2 mg of VOC per liter of gas.

The total amount of terpene-based VOC's (VOC) and water released in the stack exhaust per year is calculated below using an average of the two VOC values described above (i.e., 18.6 mg of VOC per liter of gas). Based on a 24 hour/day operation and 300 days/year.

(18.6 mg/l terpene) × (lb/45,400 mg) × (28.316 l/ft$^3$) ×

(250 ft$^3$/minute) = 0.290 lbs of *VOC*/minute (0.290 lbs/minute) × (60 minutes/hour) × (24 hours/day) ×

(300 days/year) = 125,289 lbs of *VOC*/year/line

The following calculations were made to determine the amount of VOCs in the non-condensable portion of the stack exhaust which would exit a condensing stack during normal operation of the container washing equipment. The VOC content of the finishing solution used in the present invention is 820 grams of terpene per liter as determined by test method EPA No. 24. The terpene solution used in the present invention contained 10% terpene, therefore, it contained 82 grams of terpene per liter. Hence the calculations to determine partial pressure are:

$$PP = \frac{(2 \text{ mm d-limonene}) \times (136.26 \text{ grams/mole d-limonene})}{\frac{900 \text{ grams water/liter}}{18 \text{ grams/mole water}} + \frac{86 \text{ grams terpene/liter}}{136.26 \text{ grams/mole d-limonene}}}$$

$$= \frac{(1.262 \text{ mm}) \times (\text{moles/liter})}{50.63 \text{ mole/liter}}$$

$$= 0.0249 \text{ mm}$$

The number of moles of VOC contained in the stack exhaust is calculated:

$$PV = nRT \qquad n = \frac{PV}{RT}$$

where P=Pressure
V=Volume
R=International Gas Constant
T=Temperature $$n = \frac{(0.0249 \text{ mm}) \times (1 \text{ atm}/760 \text{ mm}) \times (1 \text{ liter})}{(0.0821 \text{ l} \times \text{atm/mole} \times °K.) \times (310° K.)}$$

$$n = 1.287 \times 10^{-6} \text{ moles/liter}$$

The moles of VOCs was converted to pounds per year of d-limonene emission:

$1.287 \times 10^{-6}$ moles/liter × 136.26 grams/mole =

$1.753 \times 10^{-4}$ grams/liter $(1.753 \times 10^{-4}$ grams/liter) × (28.316 liters/ft$^3$) ×

(250 ft$^3$/min) = 1.241 grams/minute (1.241 grams/min) × (lbs/454 grams) × (60 min/hr) ×

(24 hr/day) × (300 days/year) =

1,180 lbs of noncondensable *VOCs*/year/line

The amount of non-condensable VOCs released per year is then adjusted to reflect the actual amount of VOCs released during an average production year. Therefore:

$$\frac{(1,180 \text{ lbs/yr/line}) \times (24 \text{ hr/day}) \times (320 \text{ day/yr})}{(10 \text{ hr/day}) \times (250 \text{ day/yr})} = 3,625 \text{ lb/yr/line}$$

In order to obtain the total amount of non-condensable VOCs emitted by all four of the production lines, 3,625 lbs of VOC/year must be multiplied by 4, resulting in a total of 14,500 lbs of VOC/year for all production lines. Thus for all production lines, a total of 7.25 tons of VOCs/year is produced.

The actual amount of VOCs emitted during treatment of metal containers with acid finishing agents is 220 tons of VOCs/year based on the use of four container washing and rinsing lines. The above calculations indicate that the total amount of VOCs can be reduced by 18.18% when metal containers are treated in accordance with the present method due to the 18.18% decrease in the amount of interior coating required to coat such containers. An 18.18% reduction in VOCs would result in a reduction of 40 tons of VOCs/year based on the use of four production lines. After addition of the 7.25 tons of VOCs contributed to the system by the terpene finishing agent a net reduction of 32.75 tons of VOCs/year can be achieved.

The above data is summarized in Table 1.

TABLE 1

MEASUREMENTS OF VOC STACK EXHAUST EMISSIONS

| | |
|---|---|
| Total VOCs in Stack Exhaust during d-limonene treatment | 125,289 lbs/year/line |
| Non-Condensable VOC Exhaust during d-limonene treatment | 3,625 lbs/year/line |
| Total Non-Condensable VOC Exhaust during d-limonene treatment | 7.25 tons/year/total |
| Decrease of VOCs due to Inner-Coat Usage | 40 tons/year/total |
| Total VOC Reduction during d-limonene treatment | 32.75 tons/year/total |

EXAMPLE II

An additional source of VOC emissions released during the processing of containers in the facility described in Example I is fugitive emissions. Fugitive emissions are those VOCs that are not captured by the stack and are released through open areas of the system. The total fugitive emissions per year was calculated for emissions released during the process described in Example I and were found to be negligible based on the following calculations. The laboratory data shows that at an operating temperature of 100° F., the evaporation rate was 0.002 gallons of finishing solution per square foot per hour. It is estimated that the open areas of the system of the present invention is approximately 5 square feet. Therefore, the total fugitive emissions were determined by the following calculation:

(0.002 gal/sq.ft./hr) × (5 sq.ft.) × (120 hours) ×

(10% d-limonene concentration) × (7.2 lbs/gal) × (50 weeks) =

43 lbs of fugitive *VOCs*/year.

EXAMPLE III

The average roughness of containers washed in accordance with the present invention was compared to the average roughness of containers washed using a standard acid wash. An aluminum container finished in accordance with the present method was compared to an aluminum container finished with an acidic finishing agent. The two containers were then analyzed by a scanning electron microscope and a Rank Taylor Hobson Profilometer to determine the difference in surface roughness of the outside and inside diameters of each container.

The container finished in accordance with the present invention was treated using the process as described in Example VI below. A 10 volume percent terpene composition wash was used in which the finishing agent included 93 volume percent d-limonene, 6 volume percent Tergitol NP-7 and 1 volume percent WRS-1-66. The acid treated container was treated in accordance with standard container finishing operations. Containers washed in accordance with the present invention had a smoother surface with increased reflectivity as indicated by measurements of roughness (see Table 2). A roughness average is the universally recognized and most used international parameter of the roughness of a surface. A roughness average is the arithmetic mean of the departures of the profile line produced by a profilometer from the mean line given by the following equation.

$$Ra = 1/L \int_0^L y(x)/dx$$

where $L$ = measurement length $\int_0^L$ = integral from 0 to $L$ $y$ = peak heights
$x$ = period of integration

TABLE 2

COMPARISON OF Ra VALUES BETWEEN ACID AND TERPENE WASHED CONTAINERS

| Wash | Roughness Average |
|---|---|
| Terpene Composition Wash | (Inside Diameter) 5.6 Ra |
| Acid Wash | (Inside Diameter) 12.5 Ra |
| Terpene Composition Wash | (Outside Diameter) 2.2 Ra |
| Acid Wash | (Outside Diameter) 6.0 Ra |

Table 2 indicates that containers washed with the terpene-containing composition produce a container about two to three times smoother than containers washed in a standard acid wash.

EXAMPLE IV

A test was performed to compare the amount of interior and exterior coating required to sufficiently coat the inner and outer surfaces, respectively, of metal containers washed with a standard acid wash and metal containers washed with the terpene finishing agent used in the present invention. About 60,000 containers were washed and coated in accordance with the present method and the average weight of coating required to attain sufficient coverage (i.e., visually equivalent in tone and color to those containers treated with a standard acid wash) was recorded. The results are shown in Table 3.

TABLE 3

COMPARISON COATING AMOUNTS USED ON ACID AND TERPENE WASHED CONTAINER (16 ounce)

|  | Terpene Wash Average Coating (mg/container) | Acid Wash Average Coating (mg/container) |
| --- | --- | --- |
| Exterior Coat (Ink + Exterior Coat) | 122 | 190 |
| Interior Coat | 135 | 165 |

As demonstrated by these results, there is a significant reduction in the amount of interior and exterior coat required to coat a container washed with a terpene finishing agent used in the present method as compared with a container washed with an acid wash. It was found that 37% less exterior coat was required and 18% less interior coat was required to coat containers treated with a terpene finishing agent as compared with those treated with an acid wash.

EXAMPLE V

A comparative test run was conducted to study different parameters typically used to evaluate the efficiency and quality of container coatings. The test compared aluminum beverage containers finished with an acid wash with sixty thousand aluminum beverage containers finished and coated in accordance with the present method. The results obtained are set forth in Table 4 below.

TABLE 4

COMPARISON OF COATING DUALITIES BETWEEN ACID AND TERPENE WASHED CONTAINERS

| Parameter Tested | Containers Finished With Acid Wash | Containers Finished With Terpene-Based Finishing Agent |
| --- | --- | --- |
| ERR (enamel rater reading) | Okay | Okay |
| Ink Color | Okay | Okay |
| Container cleanliness (visual measure) | Standard | Standard |
| 1) with first stage hot water rinse on |  | dark appearance |
| 2) with first stage hot water rinse off | Standard | Standard |

As demonstrated from these results, the integrity of the interior and exterior coatings are equivalent between the acid and terpene treated containers despite the decrease in amounts of coatings used. In addition, these results indicate that the ink color as well as the cleanliness of the terpene treated containers are equivalent to the acid treated containers. The dark appearance inside the containers finished by the present method is believed to be caused by the absence of etched surfaces having the ability to scatter light, making rougher surfaces appear lighter in appearance and smoother surfaces appear darker in appearance.

EXAMPLE VI

Figure 2:
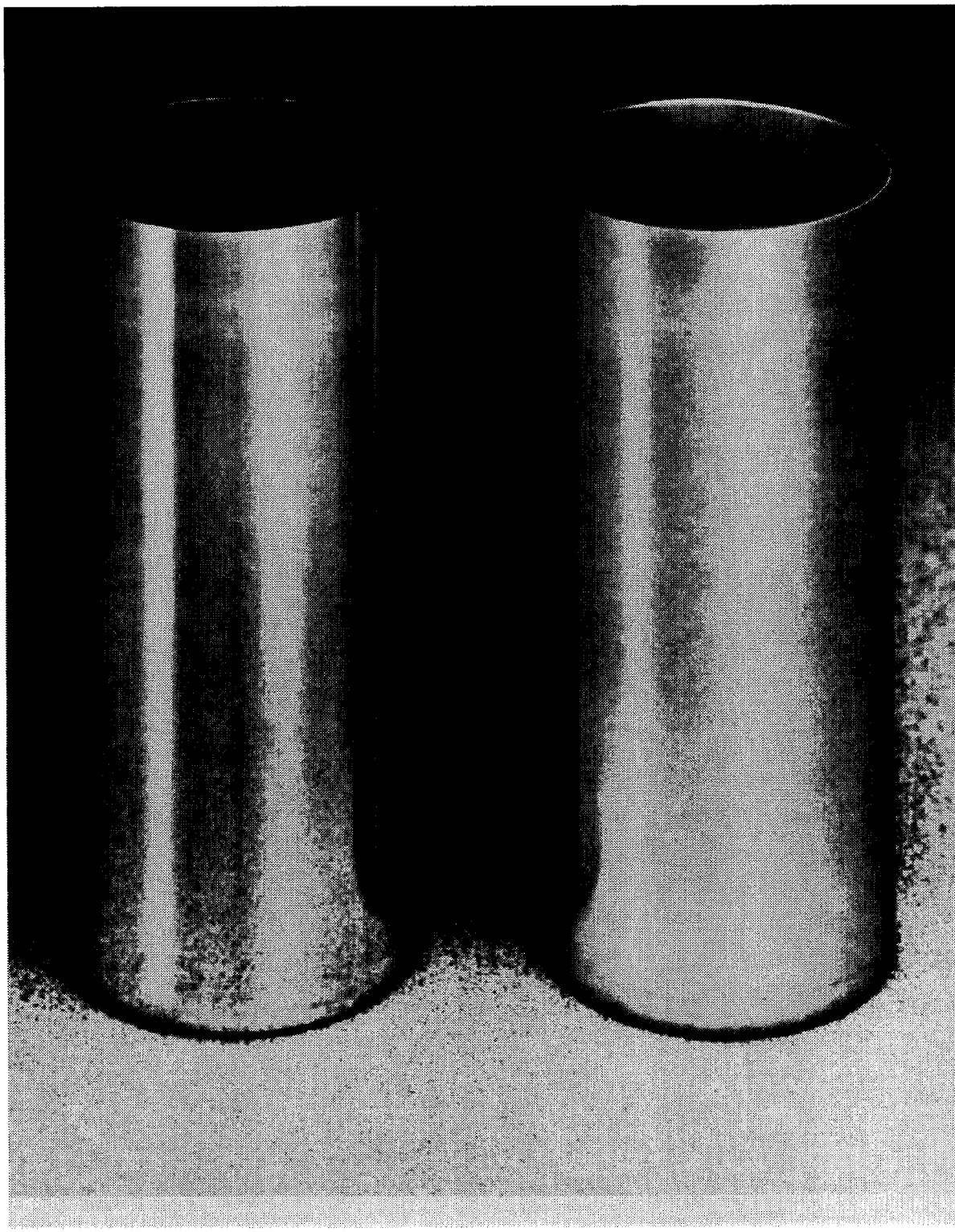
FIG. 2 is a photograph showing an aluminum container treated in accordance with the present invention compared with an aluminum container washed by a standard acid wash.

A photograph (FIG. 2) and a representative drawing (FIG. 3) are provided as a visual comparison of metal containers washed with the solution described in Table 5 below and containers washed with a standard acid wash. A testing apparatus was provided in which an aluminum container was held in an upside-down orientation. One spray nozzle was directed at the top of the container and a second nozzle was directed at the bottom. The finishing agent identified below in Table 5 was sprayed for a period of 55 seconds through both nozzles at an aluminum container having lubricants and coolants thereon. The container was then successively rinsed in three rinsing tanks containing water for a period of approximately 55 seconds and was subsequently dried.

TABLE 5

COMPOSITION OF TERPENE-CONTAINING SOLUTION

| Ingredient | Percentage by Volume |
| --- | --- |
| d-limonene | 9.28 |
| Tergitol NP-7 | 0.63 |
| WRS-1-66 | 0.09 |
| Water | 90.0 |

Figure 3B:
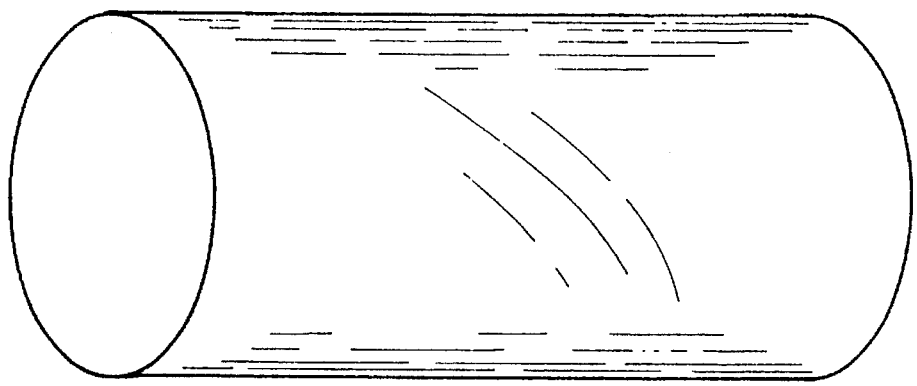
FIG. 3 is a drawing representing an aluminum container treated in accordance with the present invention compared with an aluminum container washed by a standard acid wash.
Figure 3A:
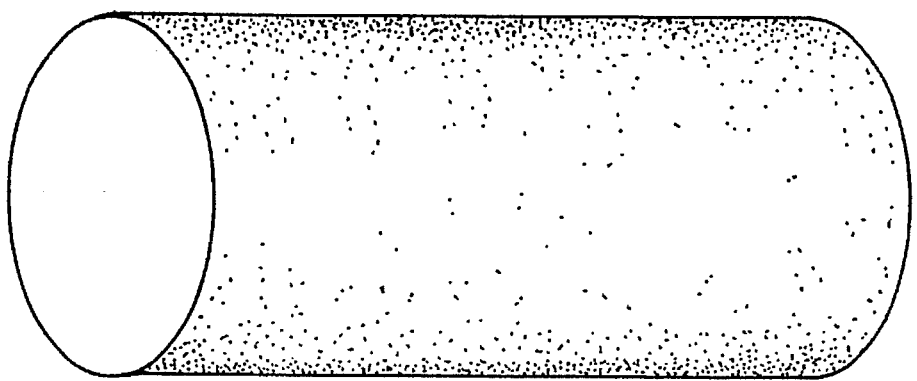

An aluminum container finished by the present process was compared to an aluminum container finished by a traditional acid finishing process using 37 percent by volume sulfuric and hydrofluoric acid with a surfactant mix and are shown by photographic comparison (FIG. 2) and using a schematic drawing for comparison (FIG. 3). Both containers were formed by an identical process and contained the same lubricants and coolants on their outer surfaces prior to finishing. As can be seen, the container finished by the present process has a shiny, highly reflective surface, while the acid washed container has a much duller, smokey appearance.

EXAMPLE VII

Figure 4A:
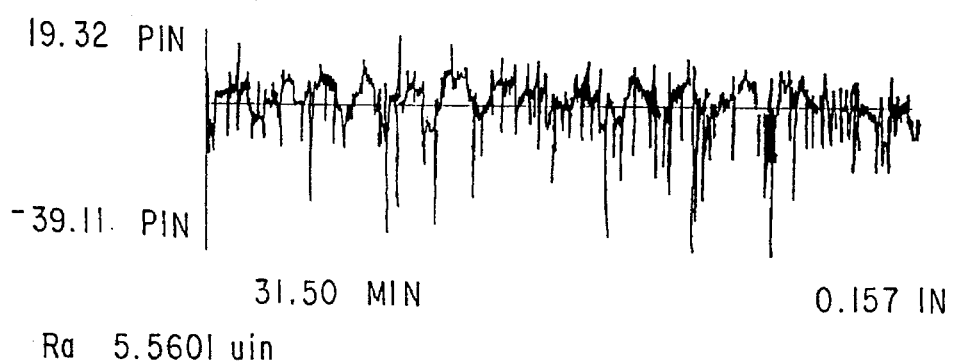
FIG. 4 is an electron micrograph of the surface of an aluminum container treated in accordance with the present invention.
Figure 4B:
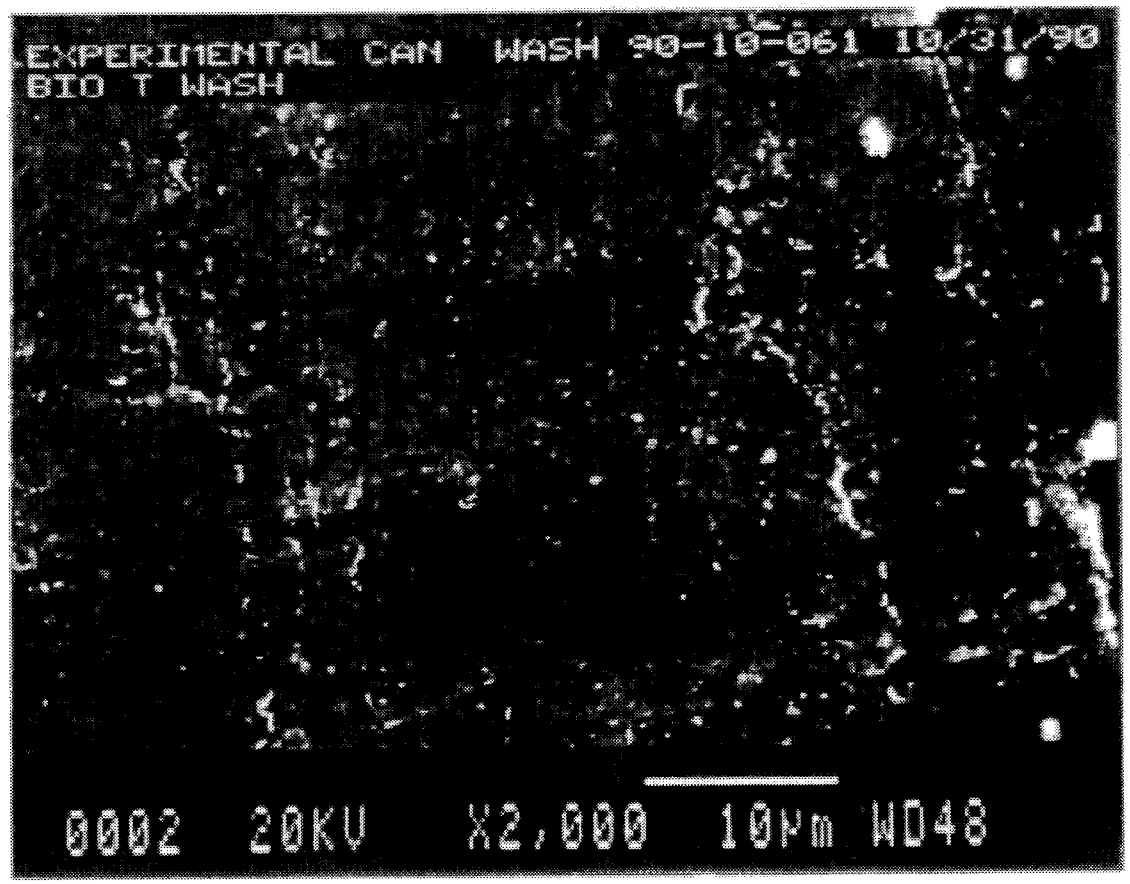
Figure 5A:
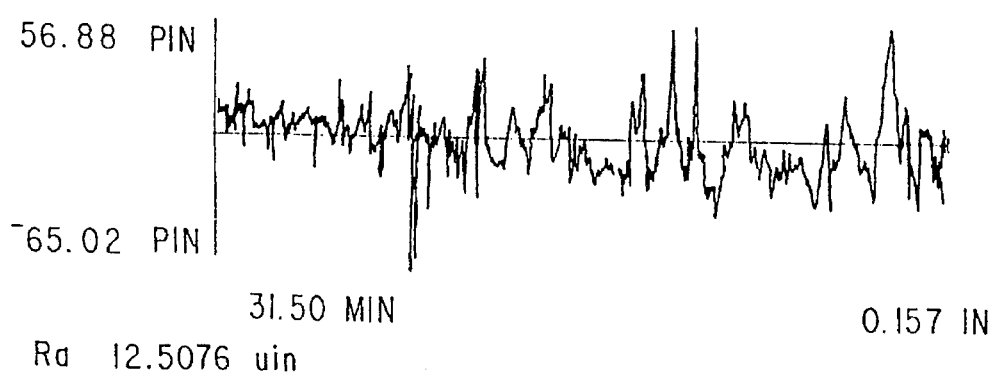
FIG. 5 is an electron micrograph of the surface of an aluminum container treated with a standard acid wash.
Figure 5B:
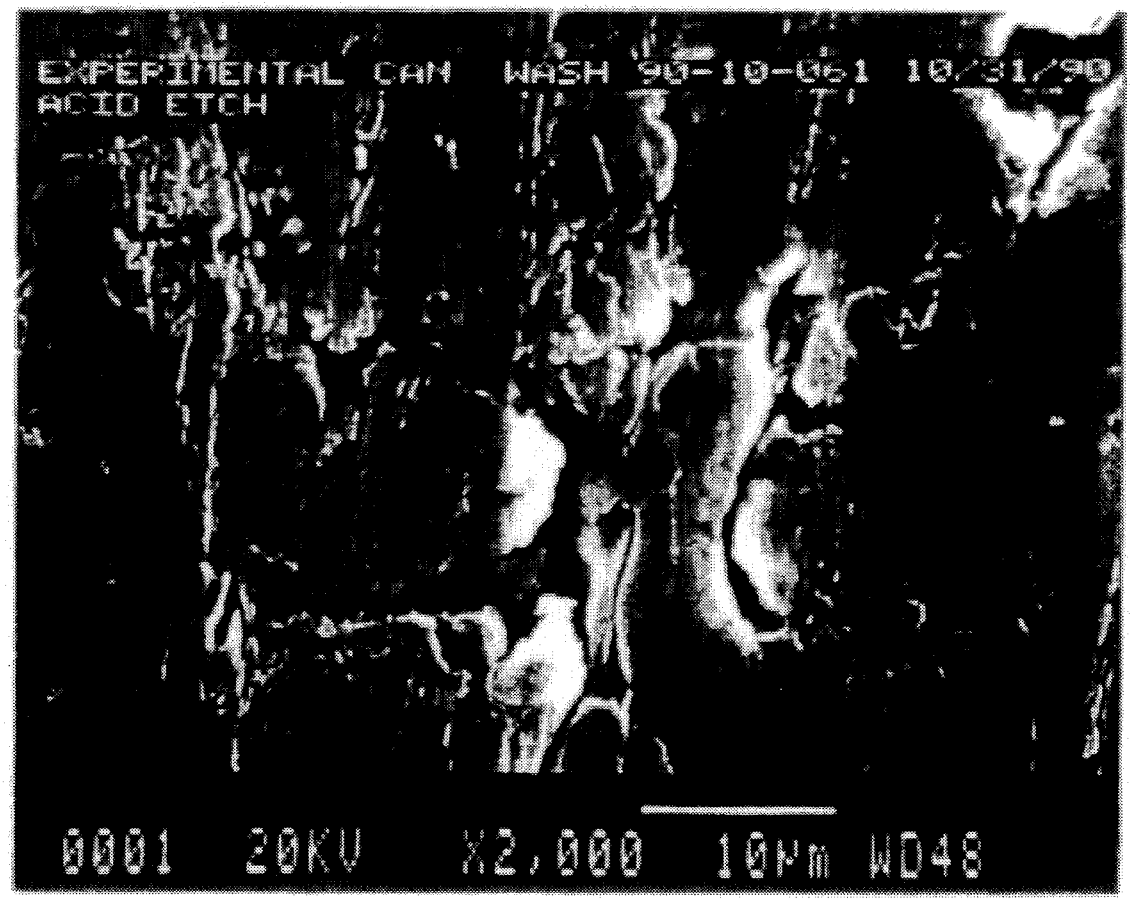

A comparative microscopic examination of the surface of aluminum containers treated in accordance with the present process and with a standard acid wash procedure was conducted. Electron micrographs of each container's surface were taken after washing. An electron micrograph of a container's surface washed in accordance with the present invention (at magnification of 500X) is shown in FIG. 4. A similar electron micrograph (500x magnification) of a container washed by a standard acid wash is shown in FIG. 5. Comparisons of the containers finished by the present process and the acid wash shows that the container finished with a d-limonene finishing agent has a much smoother surface, while the acid washed container has deeper pits and a scratched appearance. The difference in these surfaces accounts for many advantages of the present process, including a shiny appearance, better ink or paint adhesion, and reduced surface area. Such reduction in surface area achieved by use of the present invention allows for substantial reductions in VOC emissions in container finishing and coating operations.

EXAMPLE VIII

This Example illustrates that containers treated in accordance with the present invention have better coating coverage characteristics for a given amount of coating than containers washed with conventional caustic washes.

A source of 12 ounce aluminum containers were produced in a conventional container bodymaker using coolants and a synthetic lubricant having the composition identified in Table 6.

TABLE 6

Lubricant Composition

|  | Volume % |
|---|---|
| tetraester[1] | 86 |
| S-MAZ 80[2] | 6 |
| BRIJ-30[2] | 4 |
| Mazon 224-86[2] | 2 |
| Mazon RI 6[3] | 2 |

[1]The tetraester is an ester prepared by esterification of a 10–30 carbon saturated fatty acid with a pentaerythritol.
[2]S-MAZ 80, BRIJ-30 and Mazon 224-86 are commercially available surfactants from Mazer Chemical.
[3]Mazon RI 6 is a commercially available anti-rust component from Mazer Chemical.

A first group of forty containers produced as described above were washed in a 140° F. wash of a conventional caustic cleaner available from Amchem-Parker and identified as Amchem-Parker Can Washing Caustic Cleaner. After washing, the containers were thoroughly rinsed with water. A second group of forty containers produced as described above were cleaned with a 10% solution of 97 volume percent d-limonene, 6 volume percent Tergitol NP-7, and 1 volume percent WRS-1-66 at a wash solution temperature of 140° F. After washing, the containers were thoroughly rinsed with water. A third group of forty additional containers produced as described above were finished with a 10 volume percent d-limonene solution, as described above, with a wash solution temperature of 120° F. The wash solution for this third group of containers started gelling and became the consistency of hand cream. The experiment was stopped and the bath was allowed to sit overnight during which time it liquified. The next day, a fourth group of forty containers were washed in the same 10 volume percent d-limonene based finishing solution at 120° F. This fourth group of containers had been allowed to sit overnight after manufacture and before finishing. As noted below, poor results were obtained with this fourth group of containers which is believed to be due to the containers not being finished immediately after manufacture, thus allowing lubricants and coolants to dry on the surface of the containers and preventing complete washing of the surface.

After finishing, all four groups of containers were coated on the interior of the containers with a water-based epoxy coating available from Glidden having 20 volume percent solids, 64 volume percent water, and 16 volume percent volatile organic compounds. Each container was coated with 85 milligrams of the epoxy-based resin. After curing of the composition, each container was tested for the ability to conduct a current through the coating on the interior of the container using an enamel rater reading apparatus. In this test, a 1% sodium chloride solution is placed in the container and an electrode is placed in the sodium chloride solution. A second electrode is contacted to the outside of the container and a current is passed between the two electrodes. A higher current indicates a poorer coating because it indicates a reduced insulating ability of the coating. Thus, for a constant volume of coating applied to the containers (85 milligrams), a lower current indicates better coverage. The results are shown below in Table 7.

TABLE 7

COMPARISON OF ERR VALUES BETWEEN TERPENE-BASED AND CAUSTIC-BASED FINISHING SOLUTIONS AT CONSTANT COATING AMOUNTS

| Group # | Wash | Temperature (degrees Fahrenheit) | Average ERR (milliamps) |
|---|---|---|---|
| 1 | Caustic | 140 | 68 |
| 2 | Terpene | 140 | 13 |
| 3 | Terpene | 120 | 17 |
| 4 | Terpene | 120 | 73* |

*As noted above, this value is believed to be inaccurate because the containers which formed the basis of this value sat overnight after manufacture and before cleaning with the terpene-based solution, thus allowing lubricants and coolants to dry and harden.

This Example illustrates that by finishing containers with terpene-based solutions, for a given amount of coating, significantly better coverage can be obtained as measured by ERR values. Alternatively, to obtain a given ERR value, lower amounts of coatings would be needed in the case of terpene finished containers.

EXAMPLE IX

This Example illustrates that containers treated in accordance with the present invention have better coating coverage characteristics for a given amount of coating than containers washed with conventional caustic washes.

A source of 12 ounce aluminum containers were produced in a conventional container bodymaker using the commercially available coolants and a synthetic lubricant Quaker 990 AB lubricant and Bodymaker DTI 5600 coolant. A first group of 350 containers produced as described above were washed in a 140° F. wash of a conventional caustic cleaner available from Amchem-Parker and identified as Amchem-Parker Can Washing Caustic Cleaner. After washing, the containers were thoroughly rinsed with water. A second group of 350 containers produced as described above were cleaned with a 10% solution of 97 volume percent d-limonene, 6 volume percent Tergitol NP-7, and 1 volume percent WRS-1-66 at a wash solution temperature of 120° F. After washing, the containers were thoroughly rinsed with water. A third group of 350 additional containers produced as described above were cleaned with a 5 to 8 volume percent d-limonene solution in water without surfactants with a wash solution temperature of 120° F.

After cleaning, all three groups of containers were coated on the interior of the containers with a water-based epoxy coating available from Glidden having 20 volume percent solids, 64 volume percent water, and 16 volume percent volatile organic compounds. Each container was coated with 99 milligrams of the epoxy-based resin. After curing of the composition, 48 containers from each group were tested for the ability to conduct a current through the coating on the interior of the container using an enamel rater reading apparatus. In this test, a 1% sodium chloride solution is placed in the container and an electrode is placed in the sodium chloride solution. A second electrode is contacted to the outside of the container and a current is passed between the two electrodes. A higher current indicates a poorer coating because it indicates a reduced insulating ability of the coating. Thus, for a constant volume of coating applied to the containers (99 milligrams), a lower current indicates better coverage. The results are shown below in Table 8.

TABLE 8

COMPARISON OF ERR VALUES BETWEEN TERPENE-BASED AND CAUSTIC-BASED CLEANING SOLUTIONS AT CONSTANT COATING AMOUNTS

| Group # | Wash | Temperature (degrees Fahrenheit) | Average ERR (milliamps) |
|---|---|---|---|
| 1 | Caustic | 140 | 87.5 |
| 2 | Terpene | 120 | 3.0 |
| 3 | Terpene | 120 | 1.7 |

This Example illustrates that by cleaning containers with terpene-based solutions, for a given amount of coating, significantly better coverage can be obtained as measured by ERR values. Alternatively, to obtain a given ERR value, lower amounts of coatings would be needed in the case of terpene-based cleaned containers.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A method for reducing volatile organic compound emissions in the application to a surface of a VOC-containing coating, comprising:
   a) contacting said surface with an effective amount of a finishing agent having a pH of about 6.0 pH to about 9.0 pH comprising terpene to remove oils present on said surface; and
   b) applying to said contacted surface an amount of a VOC-containing coating effective to coat said surface, said VOC-containing coating including a compound selected from the group consisting of toluene, methylene chloride, isopropyl alcohol, butyl alcohol and mixtures thereof, said VOC-containing coating selected from the group consisting of inks, paints, plastic coatings and mixtures thereof.

2. The method as set forth in claim 1, wherein said surface is rinsed with water after said step of contacting.

3. The method as set forth in claim 1, wherein said volatile organic compounds comprise organic solvents.

4. The method as set forth in claim 1, wherein said surface is metal.

5. The method as set forth in claim 1, wherein said finishing agent is selected from the group consisting of d-limonene, α-terpineol, β-terpineol, α-pinene, β-pinene, alcohols thereof and mixtures thereof.

6. The method as set forth in claim 1, wherein said finishing agent is d-limonene.

7. The method as set forth in claim 1, wherein said coating comprises a coating selected from the group consisting of decorative and protective coatings.

8. The method as set forth in claim 1, wherein said coating applied to said surface is sufficient to generate an acceptable ERR value.

9. The method as set forth in claim 1, further comprising capturing VOCs derived from said finishing agent.

10. The method as set forth in claim 9, wherein said step of capturing comprises condensing volatilized terpene.

11. A method for reducing volatile organic compound emissions, comprising treating a surface with an effective amount of a terpene finishing agent having a pH of about 6.0 pH to about 9.0 pH to reduce the amount of volatile organic compound-containing coatings-required to cover said surface.

12. The method as set forth in claim 11, wherein said volatile organic compounds comprise organic solvents.

13. The method as set forth in claim 11, wherein said solvents comprise those selected from the group consisting of toluene, methylene chloride, isopropyl alcohol, butyl alcohol and mixtures thereof.

14. The method as set forth in claim 11, wherein said surface comprises metal.

15. The method as set forth in claim 14, wherein said metal has a roughness average of less than about 10.0 Ra before and after being treated in accordance with said method.

16. The method as set forth in claim 11, wherein said surface is that of a metal container having interior and exterior surfaces.

17. The method as set forth in claim 16, wherein said metal containers comprise aluminum beer containers.

18. The method as set forth in claim 16, wherein the amount of said coating required to coat said interior of said container is below about 165 milligrams of coating per 16 oz. container.

19. The method as set forth in claim 16, wherein the amount of said coating required to coat said exterior of said container is between about 155 milligrams and about 135 milligrams of coating per 16 oz. container.

20. The method as set forth in claim 11, wherein said finishing agent is selected from the group consisting of d-limonene, α-terpineol, β-terpineol, α-pinene, β-pinene, alcohols thereof and mixtures thereof.

21. The method as set forth in claim 11, wherein said finishing agent comprises d-limonene.

22. The method as set forth in claim 11, wherein the pH of said finishing agent is between about 6 and about 8.

23. The method as set forth in claim 11, wherein the pH of said finishing agent is between about 6.5 and about 7.5.

24. The method as set forth in claim 11, wherein said finishing agent comprises between about 2 percent by volume and about 40 percent by volume of terpene.

25. A method for reducing volatile organic compound emissions in the manufacture of metal containers, said containers having interior and exterior surfaces, comprising:
   a) contacting an effective amount of a terpene finishing agent having a pH of about 6.0 pH to about 9.0 pH to substantially remove contaminants present on said metal containers, said containers having a surface roughness average of less than about 10.0 Ra after said contaminants are substantially removed; and
   b) applying said metal containers with an amount of a volatile organic compound-containing coating to effectively cover the interior of said containers, said amount of coating being less than about 165 mg per 16 oz. container.

26. The method as set forth in claim 25, wherein the roughness average of said interior surface of said metal container is less than about 10.0 Ra before and after said step of contacting.

27. The method as set forth in claim 25, wherein the roughness average of the outer surface of said metal container is less than about 5.0 Ra before and after said step of contacting.

28. A method for reducing volatile organic compound emissions comprising reducing the etching of a metal surface by treating said surface with a terpene finishing agent having a pH of about 6.0 pH to about 9.0 pH prior to coating said metal surface with a volatile organic compound-containing coating and coating said metal surface with an amount of said volatile organic compound-containing coating to effectively cover said metal surface.

* * * * *